(12) United States Patent
Honeycutt

(10) Patent No.: US 12,202,688 B2
(45) Date of Patent: Jan. 21, 2025

(54) GANGWAY ASSEMBLY

(71) Applicant: Safe Rack LLC, Andrews, SC (US)

(72) Inventor: Robert W. Honeycutt, Pawleys Island, SC (US)

(73) Assignee: SAFE RACK LLC, Andrews, SC (US)

( * ) Notice: Subject to any disclaimer, the term of this patent is extended or adjusted under 35 U.S.C. 154(b) by 829 days.

(21) Appl. No.: 17/152,487

(22) Filed: Jan. 19, 2021

(65) Prior Publication Data

US 2021/0221629 A1    Jul. 22, 2021

Related U.S. Application Data

(60) Provisional application No. 62/962,552, filed on Jan. 17, 2020.

(51) Int. Cl.
*B65G 69/28* (2006.01)
*B65G 67/02* (2006.01)
*B66F 7/28* (2006.01)

(52) U.S. Cl.
CPC ......... *B65G 69/2876* (2013.01); *B65G 67/02* (2013.01); *B66F 7/28* (2013.01)

(58) Field of Classification Search
CPC ........ B65G 69/2876; B65G 67/02; B66F 7/28
See application file for complete search history.

(56) References Cited

U.S. PATENT DOCUMENTS

| | | | |
|---|---|---|---|
| 2,974,336 A | 3/1961 | Kelley | |
| 4,457,402 A * | 7/1984 | Del Vecchio | ......... B66B 9/0869 |
| | | | 105/449 |
| 6,678,910 B2 | 1/2004 | Smith | |
| 7,950,095 B2 | 5/2011 | Honeycutt et al. | |
| 8,046,858 B2 | 11/2011 | Honeycutt | |
| 8,387,191 B2 | 3/2013 | Honeycutt | |
| 8,782,838 B2 | 7/2014 | Honeycutt et al. | |
| 9,546,458 B1 | 1/2017 | Willard et al. | |
| 10,145,070 B2 | 12/2018 | Reichert et al. | |
| 10,253,464 B2 | 4/2019 | Lawson et al. | |
| 2006/0054392 A1 | 3/2006 | Macdonald et al. | |
| 2009/0144916 A1 | 6/2009 | Honeycutt et al. | |
| 2012/0006618 A1 | 1/2012 | Dubose et al. | |
| 2017/0030034 A1* | 2/2017 | Lawson | ................. B60R 3/005 |
| 2020/0317456 A1 | 10/2020 | Lawson et al. | |
| 2022/0297773 A1* | 9/2022 | Traylor | ................ B62D 53/062 |

OTHER PUBLICATIONS

Apr. 1, 2021 Search Report and Written Opinion issued in International Patent Application No. PCT/US2021/013974; 15 pp.
Extended European Search Report, European Application No. 21740799, dated Dec. 19, 2023, 7 pages.

* cited by examiner

*Primary Examiner* — Nirvana Deonauth
(74) *Attorney, Agent, or Firm* — Nelson Mullins Riley & Scarborough LLP

(57) ABSTRACT

A gangway for use with a container to be accessed is provided. The gangway comprises a fixed platform and a support structure connected to the fixed platform in a manner that allows the support structure to rotate with respect to the fixed platform between a raised stowed position and a lowered deployed position. An end platform is pivotally connected at the distal end of the support structure, the end platform defining an upper walking surface and a bottom surface that engages the top of the container, the height between the bottom surface and the walking surface being no greater than one inch.

18 Claims, 15 Drawing Sheets

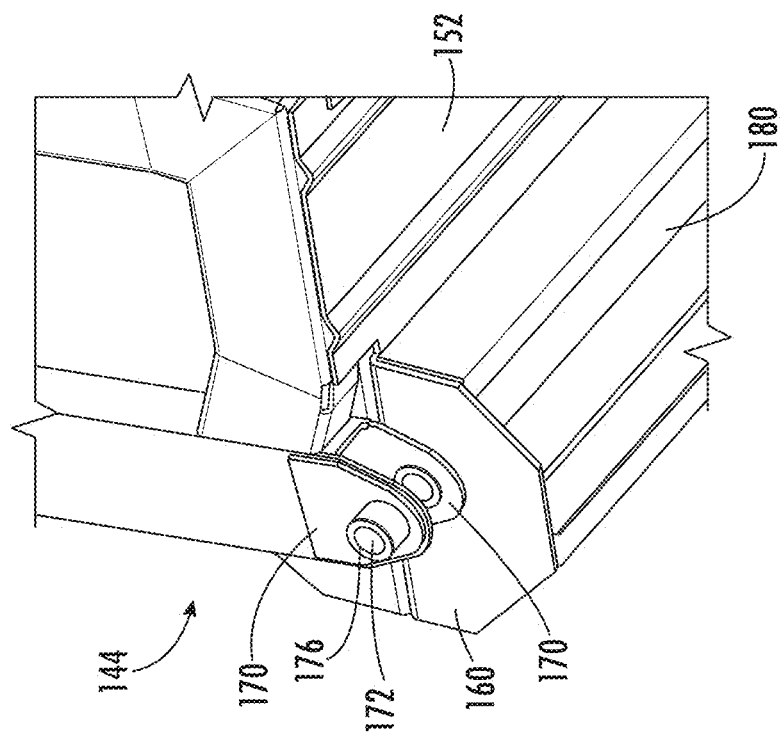
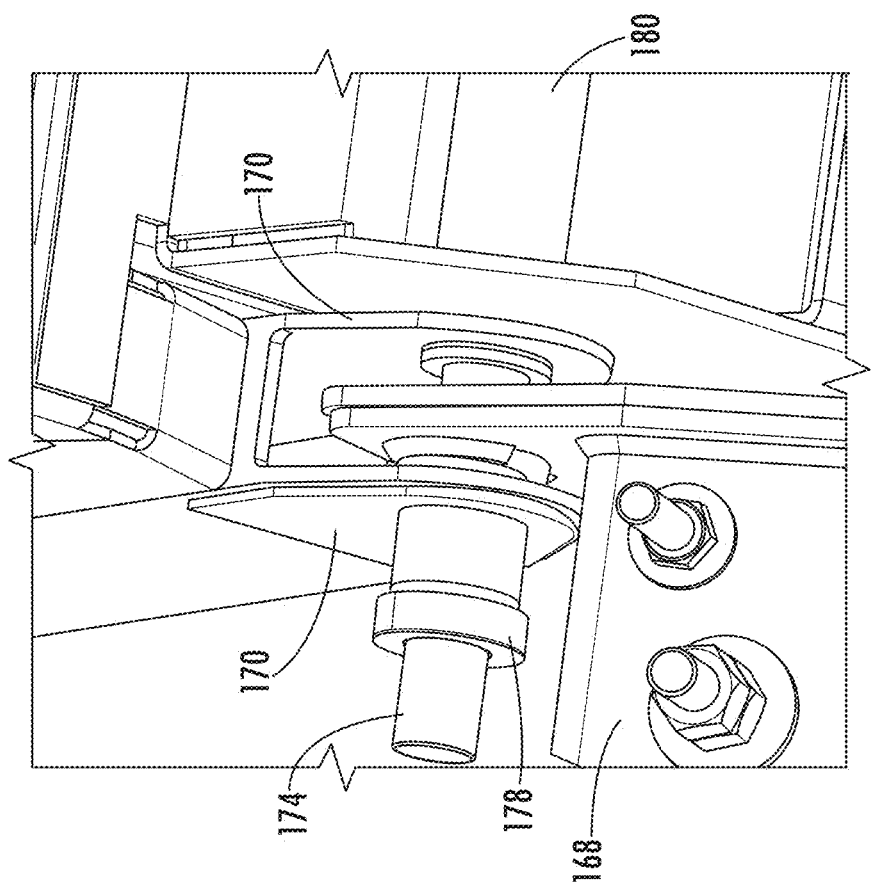

GANGWAY ASSEMBLY

PRIORITY CLAIM

This application is based upon and claims the benefit of U.S. provisional application Ser. No. 62/962,552, filed Jan. 17, 2020, which is incorporated herein by reference in its entirety for all purposes.

FIELD OF THE INVENTION

The present invention relates to fall restraint equipment, and more particularly, to a gangway that is operative to move between a raised (stowed) position and a lowered (deployed) position.

BACKGROUND OF THE INVENTION

Gangways may be used to provide access from a platform to an area such as the top of a storage container, vehicle, or ship. For example, a semi-trailer truck or a railroad carriage transporting dry goods may need to be inspected, loaded, or unloaded from the container's top. A gangway is used to span the distance between a stationary platform and the top of the container.

In this regard, the proximal end of the gangway is pivotally connected to the stationary platform so as to be stowed in a raised position. Typically, a foot lock is provided to maintain the gangway in the raised position. Once the container is in position, the foot lock is released by the operator, allowing the gangway to move into its lowered position. Once fully lowered, a platform at the distal end of the gangway will be adjacent the top of the container.

When access to the top of the container is no longer needed (e.g., due to completion of the unloading process), the gangway is manually raised back to the stowed position until the foot lock is engaged. In a common arrangement, heavy-duty chains are attached on each side of the gangway near its distal end. The chains can be locked with respect to platform uprights to prevent further lowering of the gangway when the desired location is reached. In addition, the chains are pulled to raise the gangway to its raised position.

SUMMARY OF THE INVENTION

The present invention recognizes and addresses the foregoing considerations, and others, of prior art construction and methods.

One aspect of the present invention provides a gangway for use with a container to be accessed. The gangway comprises a fixed platform and a support structure connected to the fixed platform in a manner that allows the support structure to rotate with respect to the fixed platform between a raised stowed position and a lowered deployed position. An end platform is pivotally connected at the distal end of the support structure, the end platform defining an upper walking surface and a bottom surface that engages the top of the container, the height between the bottom surface and the walking surface being no greater than one inch.

In some exemplary embodiments, the end platform comprises a main platform structure formed of a bottom piece and a separate top piece assembled together. For example, each of the bottom piece and the top piece may be formed of a single piece of sheet metal. The top piece may define a pair of opposed lateral flanges on respective lateral sides of the walking surface. In addition, first and second side structures may be attached to respective outside surfaces of the lateral flanges. Each of the side structures may comprise first and second uprights. The top piece may further comprise an end channel in which a front edge of the bottom piece is seated.

In some exemplary embodiments, the bottom piece may include a pair of opposed side plates defining aligned side plate holes for passage of an axle. The side structures in such embodiments may define respective depending flanges defining flange holes aligned with the side plate holes. A portion of the support structure may interpose each of the side plates and a respective one of the depending flanges of the respective side structures.

Embodiments are contemplated in which the end platform comprises a main platform structure formed of a unitary piece of sheet metal configured to provide the walking surface, the bottom surface, opposed lateral flanges and opposed side pieces. According to some embodiments, a distal end of the end platform defines a channel in which a resilient bumper is seated. The gangway may also include a self-raising assembly operative to rotate the support structure from the deployed position to the stowed position.

Other aspects of the present invention provide a gangway for use with a container to be accessed. The gangway comprises a fixed platform and a support structure connected to the fixed platform in a manner that allows the support structure to rotate with respect to the fixed platform between a raised stowed position and a lowered deployed position. An end platform is pivotally connected at the distal end of the support structure. The end platform defines an upper walking surface and a bottom surface that engages the top of the container. The end platform has a main platform structure formed of a bottom piece and a separate top piece assembled together.

A still further aspect of the present invention provides a gangway for use with a container to be accessed. The gangway comprises a fixed platform and a support structure connected to the fixed platform in a manner that allows the support structure to rotate with respect to the fixed platform between a raised stowed position and a lowered deployed position. First and second proximal uprights are located on lateral sides of the support structure. First and second distal uprights are also located on lateral sides of the support structure. A first handrail is pivotally connected to the first proximal upright and the first distal upright. A second handrail is pivotally connected to the second proximal upright and the second distal upright. Each of the first and second handrails has a main tube portion from which unitary tabs extend, the uprights being connected at the tabs.

In some exemplary embodiments, the main tube portion and fins comprise a section of a continuous aluminum extrusion. In addition, each of the first and second handrails may comprise a separate hand grip attached to the main tube portion. Moreover, each of the first and second handrails may comprise a pair of end caps connected to respective ends of the main tube portion.

In some exemplary embodiments, the gangway may further comprise a first midrail pivotally connected to the first proximal upright and the first distal upright and a second midrail pivotally connected to the second proximal upright and the second distal upright. At least one of the midrails in such embodiments may comprise an end cap having indicia of a manufacturer thereon.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 10-12 are enlarged perspective views showing certain detail of the attachment of the end platform to the support structure of the gangway assembly of FIG. 3.

Figure 1:
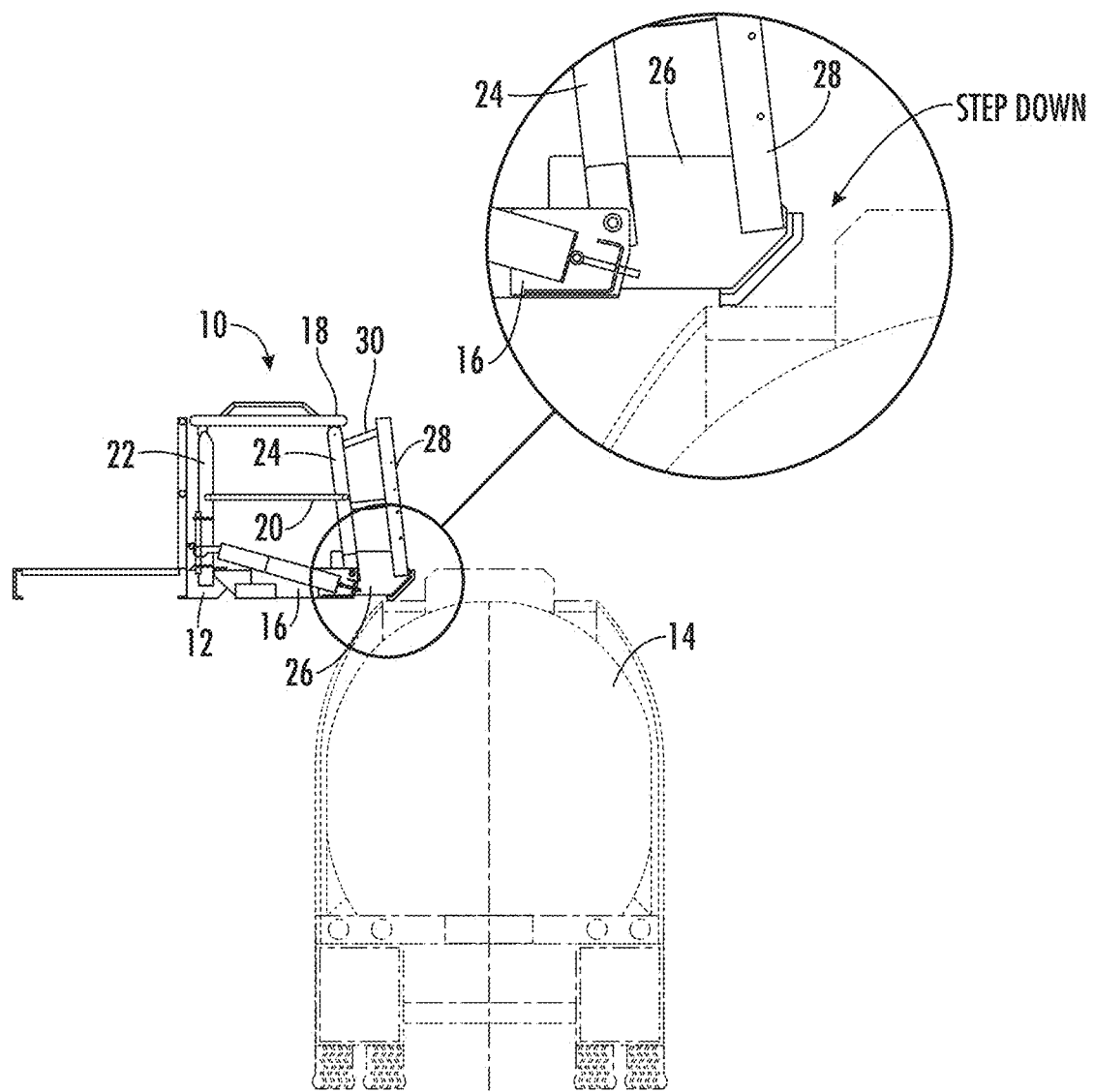
FIG. 1 illustrates a gangway assembly of the prior art lowered so that its distal end is adjacent to a container, with a portion enlarged so that additional detail can be more easily seen.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Examples of gangways, their components, and associated fall restraint equipment are set forth in U.S. Pat. No. 7,950,095 (entitled "Gangway and Method for Manufacturing Same"), U.S. Pat. No. 8,387,191 (entitled "Gangway Bearing Retainer Plate"), U.S. Pat. No. 10,145,070 (entitled "Gangway Having Hydraulic Position Locking Assembly"), and U.S. Pat. No. 10,253,464 (entitled Gangway Having Position Locking Assembly"), all of which are incorporated fully herein by reference for all purposes. Moreover, it is anticipated that aspects of a gangway as disclosed herein may be utilized in connection with a self-raising gangway as described in U.S. Pub. No. 2020/0317456, published Oct. 8, 2020 and entitled "Gangway Having Self-Raising Assembly," which is also incorporated fully herein by reference for all purposes.

FIG. 1 illustrates a gangway 10 of the prior art. The proximal end of gangway 10 is pivotally connected to a fixed platform 12 located at the appropriate height above the ground surface. In this case, for example, gangway 10 is located so that it may be moved from a raised (stowed) position into a lowered (deployed) position with respect to a container (such as trailer 14) to be loaded or unloaded. As one skilled in the art will understand, such containers often have one or more hatches on the top to which a worker needs access. For example, platform 12 may be maintained at this height by a support column (not shown).

Gangway 10 has a support structure 16 that pivots with respect to platform 12. (As used herein, the term "platform" as it pertains to platforms 12 and 112 may refer to the entire platform 12 or to a portion of gangway 10 which is fixedly attached to an existing platform. Moreover, the terms "proximal end" and "distal end" of the support structure and/or gangway refer to the area near the actual ends nearer to and farther from the platform 12 or 112.) A ramp (or a set of pivotal stairs) is carried by the support structure. Gangway 10 further includes a pair of parallel hand rails (e.g., hand rail 18) between which the operator walks to access the top of the container. Midrails, such as midrail 20, may also be provided. Respective ends of the handrails and midrails are pivotally connected to proximal and distal uprights 22 and 24.

An end platform 26 (sometimes called a "seatainer") is located at the distal end of support structure 16. As shown, end platform 26 may carry end uprights, such as upright 28, located on left and right sides of platform 26. The end uprights may be attached to the distal uprights 24 via cross-pieces, such as cross-piece 30.

As can be seen most easily in the enlarged portion of FIG. 1, end platform 26 has a height (i.e., vertical thickness), typically in the range of several inches (four inches or more). As a result, the walking surface of the end platform will be elevated above the top of the container by a equivalent amount when end platform 26 is resting on the top of the container. This may require the worker to step down from the end platform to the top of the container. Depending on the shape or configuration of the top of the container, such a step may be considered undesirable. Additional aspects of a prior art gangway are shown in previously-mentioned U.S. Pat. No. 7,950,095.

Figure 2:
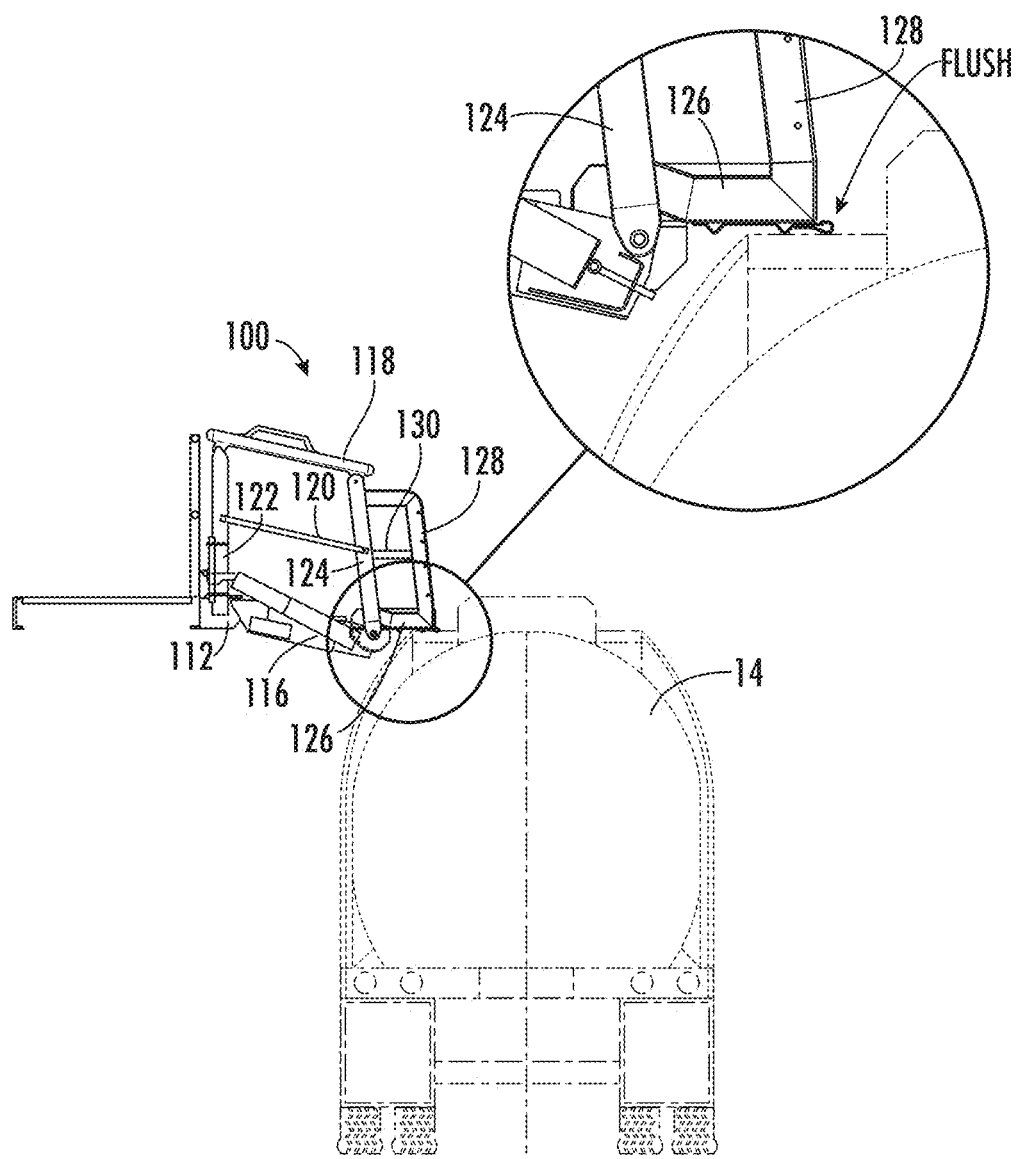
FIG. 2 is a view similar to FIG. 1 of a gangway assembly constructed in accordance with an embodiment of the present invention.
Figure 3:
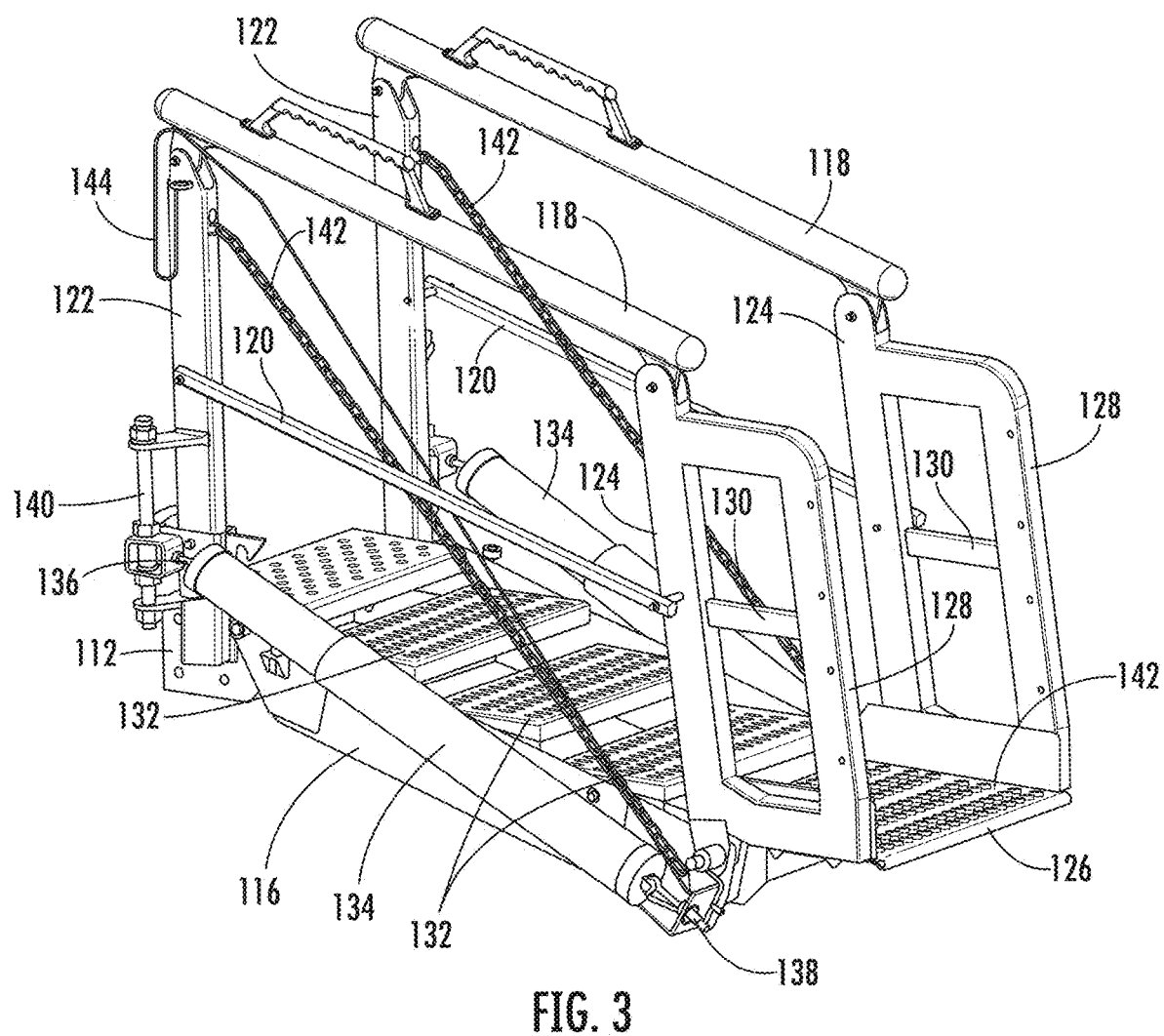
FIG. 3 is a perspective view of a gangway assembly constructed in accordance with an embodiment of the present invention.

Referring now to FIGS. 2 and 3, a gangway 100 constructed in accordance with an embodiment of the present invention is illustrated. Gangway 100 has a support structure 116 that pivots with respect to platform 112. Gangway 100 further includes a pair of parallel hand rails 118 between which the operator walks to access the top of the container. Midrails 120 may also be provided. Respective ends of the handrails and midrails are pivotally connected to proximal and distal uprights 122 and 124. An end platform 126 is located at the distal end of support structure 116. As shown, end platform 126 may carry end uprights, such as upright 128, located on left and right sides of platform 126. The end uprights may be attached to the distal uprights 124 via cross-pieces 130.

Referring now specifically to FIG. 3, support structure 116 in this case supports a set of pivotal stairs 132. (In other embodiments, support structure 116 may include a ramp rather than pivotal stairs.) In this view, gangway 100 is oriented in the lowered (deployed) position. As one skilled in the art will appreciate, gangway 100 may be stowed when not use by rotating support structure 116 such that it is oriented in an upward (i.e., generally vertical) position.

As known in the prior art, manual raising and lowering of gangway 100 may be facilitated by counterbalance springs located on lateral sides of support structure 116. In this embodiment, however, a pair of hydraulic cylinders 134 are provided at the locations where the counterbalance springs would otherwise be. (Note that the actual cylinders may be contained inside a sheath, as shown.) The hydraulic cylinders are part of a self-raising assembly (or more simply "raising assembly") that moves support structure 116 to the stowed position when actuated by a user. Such a self-raising assembly is more fully described in U.S. Pub. No. 2020/0317456, noted above.

As indicated at 136 and 138, each such cylinder may be connected in this embodiment between a fixed structure at platform 112 and the area of the distal end of support structure 116. For example, the proximal end of cylinder 134 is in this case attached to a mount 140 which is itself attached to the outboard side of upright 122. A pair of lateral chains 142 are provided to lock the gangway in the lowered position (i.e., to prevent it from lowering further). A pull rope 144 is provided for actuation of a self-raising assembly.

Referring again also to FIG. 2, it can be seen that end platform 126 has a novel configuration. In particular, the height of end platform 126 between the bottom surface that engages the top of container 14 and walking surface 142 is minimized (e.g., preferably no greater than about one inch). As a result, a worker accessing the top of container 20 is not required to step down from the end platform 126 to the top of the container as was the case with the prior art gangway shown in FIG. 1.

Figure 5:
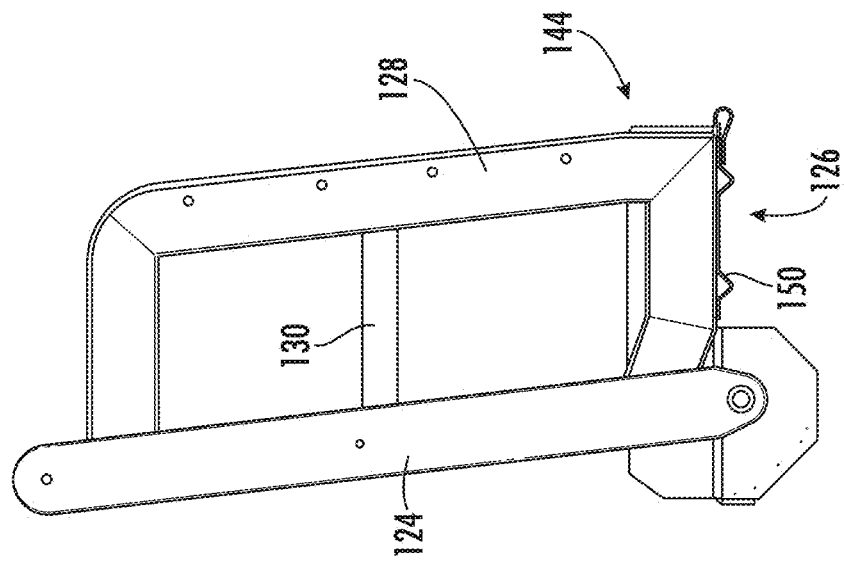
FIG. 5 is a side elevation of the end platform of the gangway assembly of FIG. 3.
Figure 4:
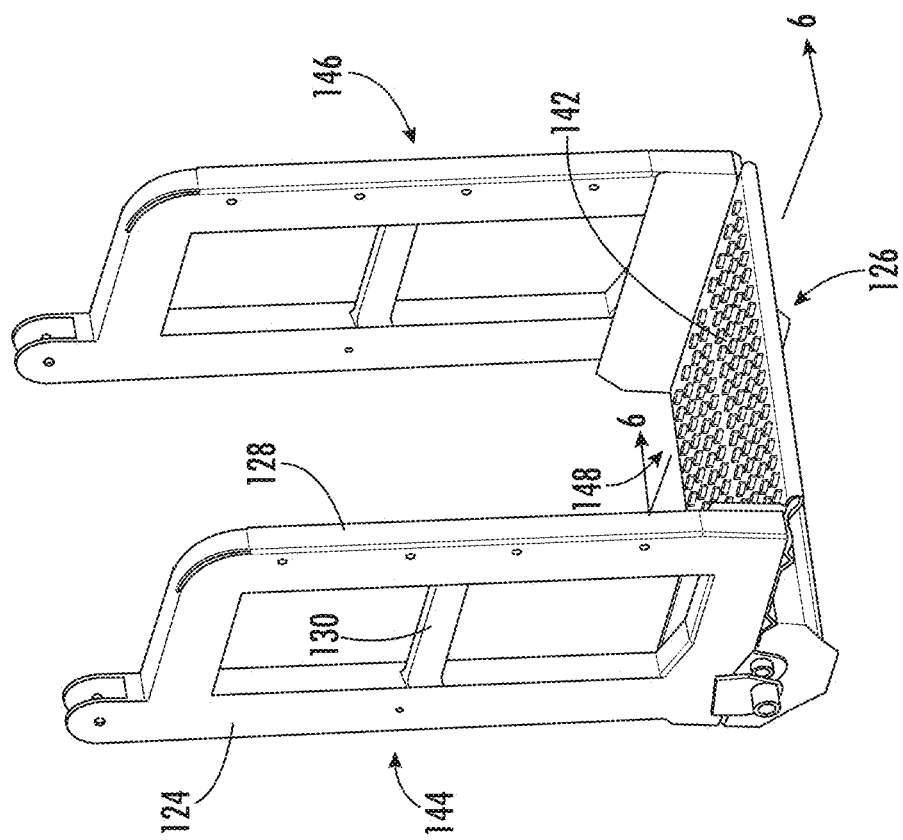
FIG. 4 is a perspective view of the end platform of the gangway assembly of FIG. 3.
Figure 6:
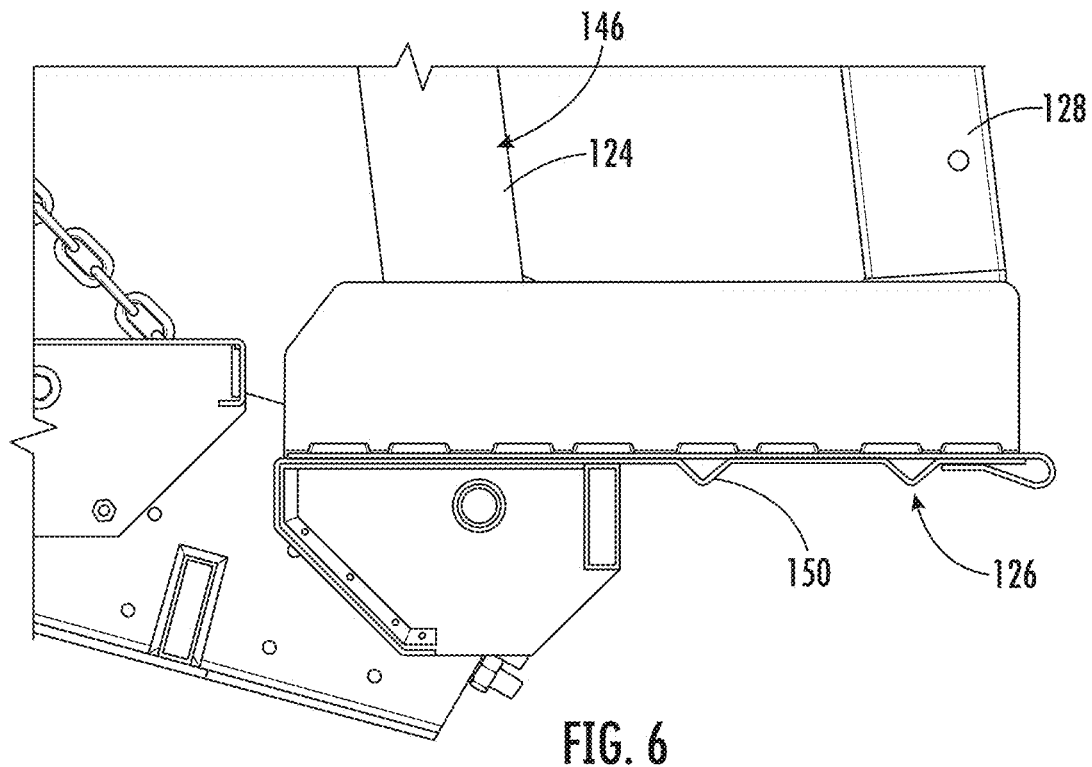
FIG. 6 is a cross-sectional view of the end platform as taken along line 6-6 of FIG. 4.

Referring now to FIGS. 4-6, certain additional details of end platform 126 can be seen. As shown, uprights 124 and 128 and cross piece 130 are integral portions of first and second side structures 144 and 146 that are attached to lateral sides of a main platform structure 148, such as by welding. Main platform structure 148 defines the walking surface 142 as well as the bottom surface 150 that rests on top of the container 14.

Figure 7:
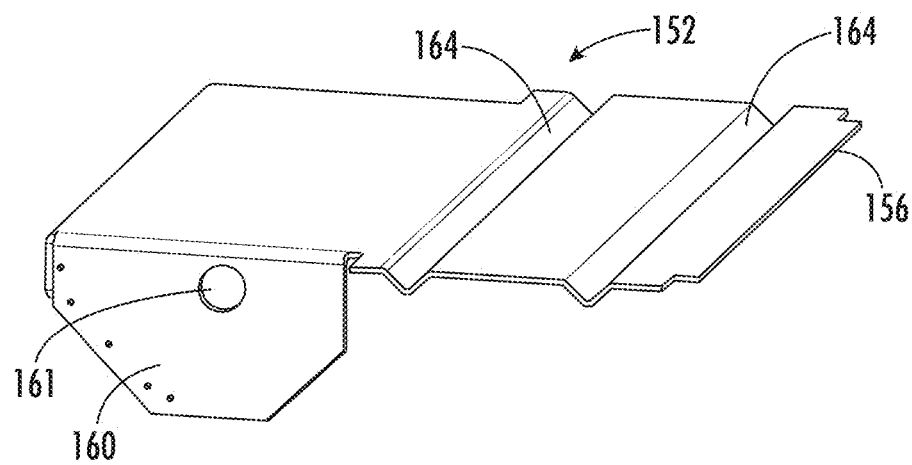
FIGS. 7 and 8 are perspective views of separate unitary pieces of the end platform in accordance with an embodiment of the present invention.
Figure 8:
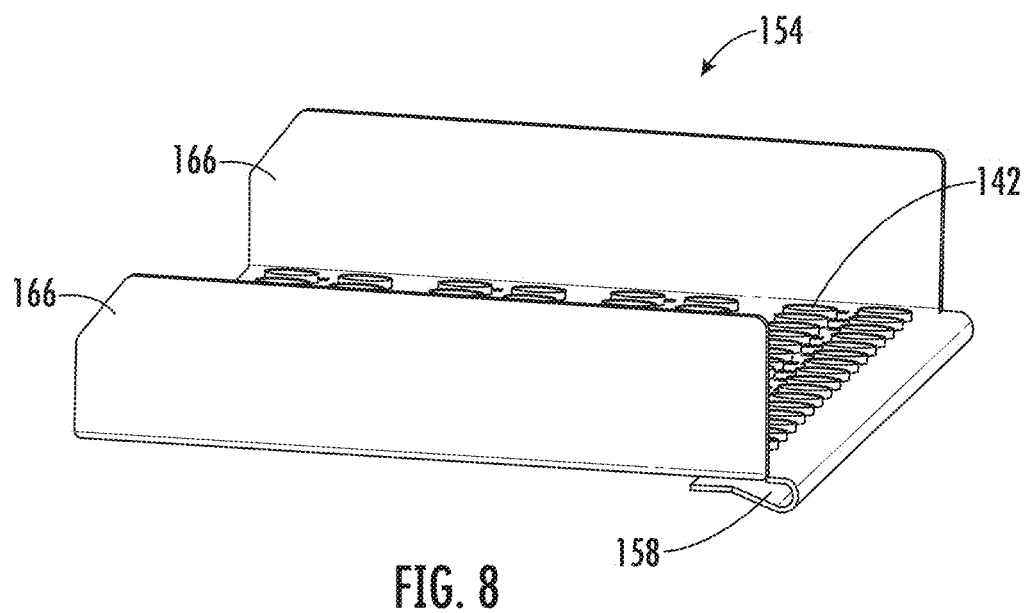
Figure 9:
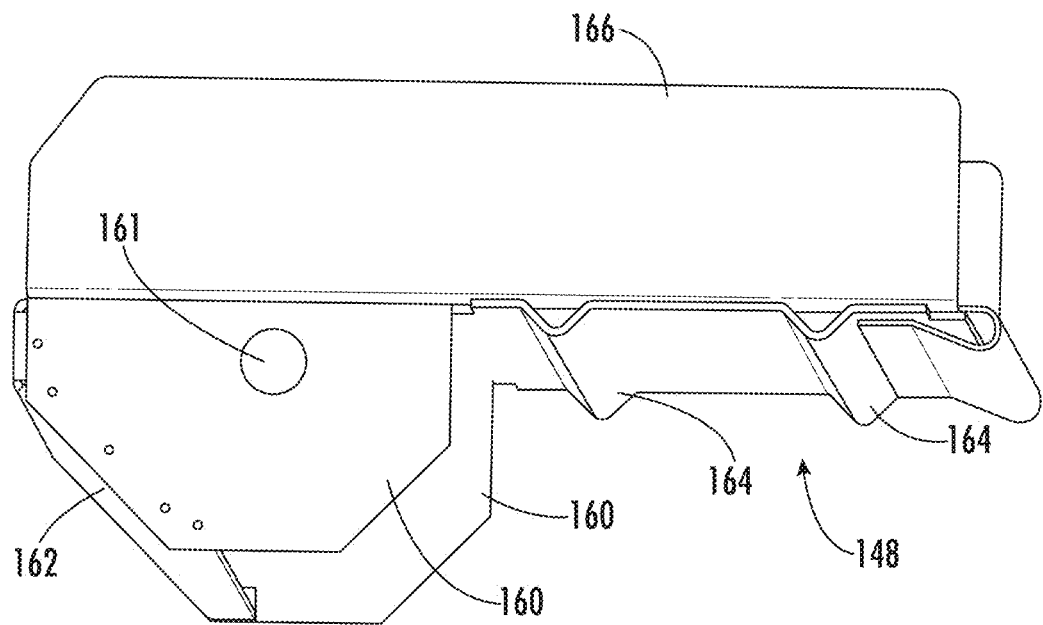
FIG. 9 is a perspective view of the separate unitary pieces of FIGS. 7 and 8 assembled together.

As shown in FIGS. 7-9, main platform structure 148 is formed in this embodiment from two pieces that are assembled together. In this regard, bottom piece 152 (FIG. 7) is placed under top piece 154 (FIG. 8) until its front edge 156 is appropriately seated in a channel 158 defined by top piece 154. Pieces 152 and 154 are then fixed with respect to each other, such as by welding. As can be seen, bottom piece 152 defines integral side plates 160, a back plate 162 (FIG. 9), and cross ribs 164, all formed in this embodiment by folding a flat piece of sheet metal. As shown, side plates 160 define aligned holes 161. Similarly, top piece 154 has lateral flanges 166, also formed in this embodiment by folding a flat piece of sheet metal. In addition, walking surface 142 is made textured by punching a series of perforations up through top piece 154.

Figure 10:
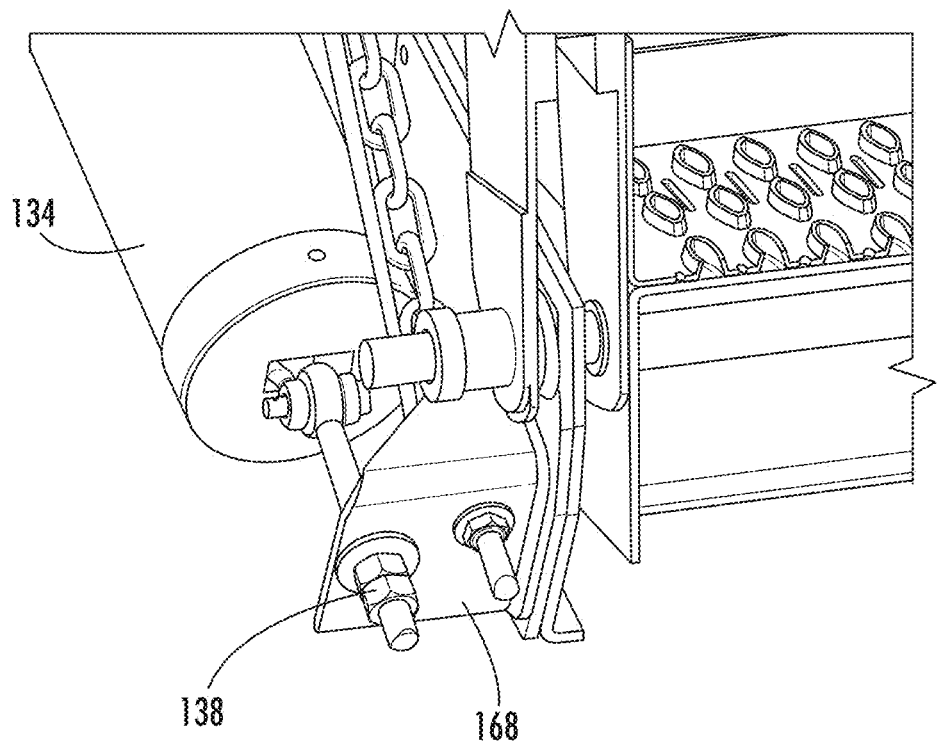

Certain additional details are shown in FIGS. 10-12. In this regard, it can be seen in FIG. 10 that cylinder 134 is attached to support structure 116 near end platform 126 via a respective flange 168 (thus forming distal attachment location 138). A distal end of chain 142 can also be attached at flange 168 as well as a guide for pull rope 144.

Side structures 144 and 146 each carry a pair of depending flanges 170 between which an end portion of support structure 116 is received. In this regard, flanges 170 define holes (e.g., hole 172) that align with a hole in the end portion of support structure 116 and holes 161. A rod (axle) 174 extends through all of these aligned holes to allow relative rotation between the support structure 116 and end platform 126 as gangway 100 is raised and lowered. Bushings, such as bushing 176, may be located in the aligned holes to facilitate the rotation. Retention collars, such as collar 178, may be provided around rod 174 near its two ends to maintain the rod in position. A tube 180 may be fixed between side plates 160 to enclose rod 174 in this region and strengthen the overall assembly.

Figure 13:
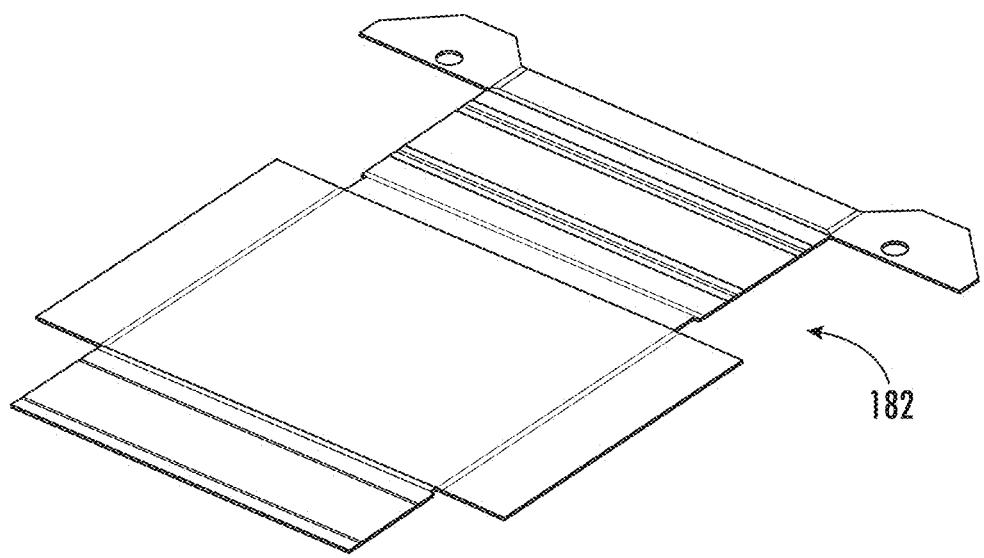
FIGS. 13-17 are perspective views showing the folding sequence of a unitary panel in order to form a portion of an end platform in accordance with an embodiment of the present invention.
Figure 14:
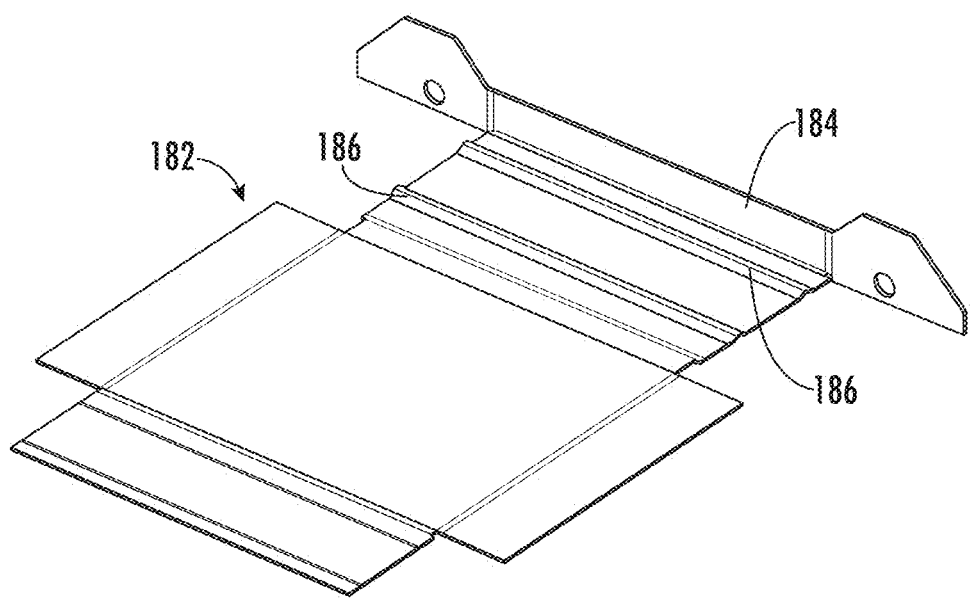

FIGS. 13-17 illustrate formation of an end platform in which much of it is formed using one piece of sheet metal. Like the previous embodiment, this embodiment provides a minimal height between the bottom surface that engages the container and the walking surface. In this regard, FIG. 13 shows a cut "blank" 182 of sheet metal that will be used to form the end platform. Next, as shown in FIG. 14, a first end portion 184 is folded so as to be perpendicular to the remainder of blank 182. A plurality of cross ribs 186 have also been formed.

Figure 15:
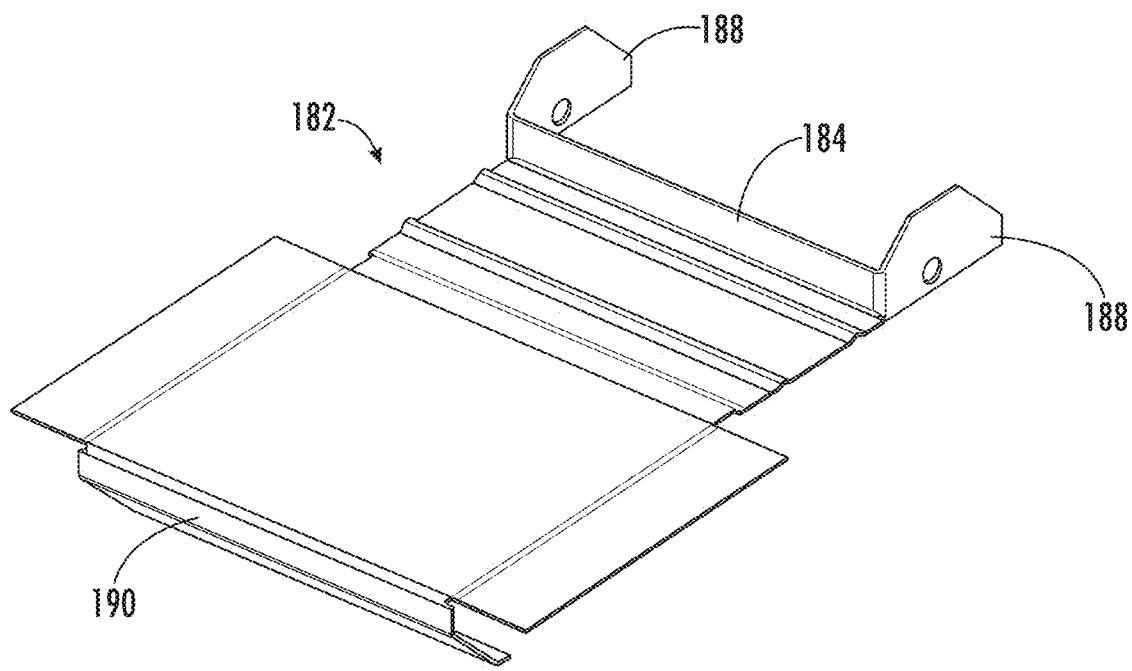
Figure 16:
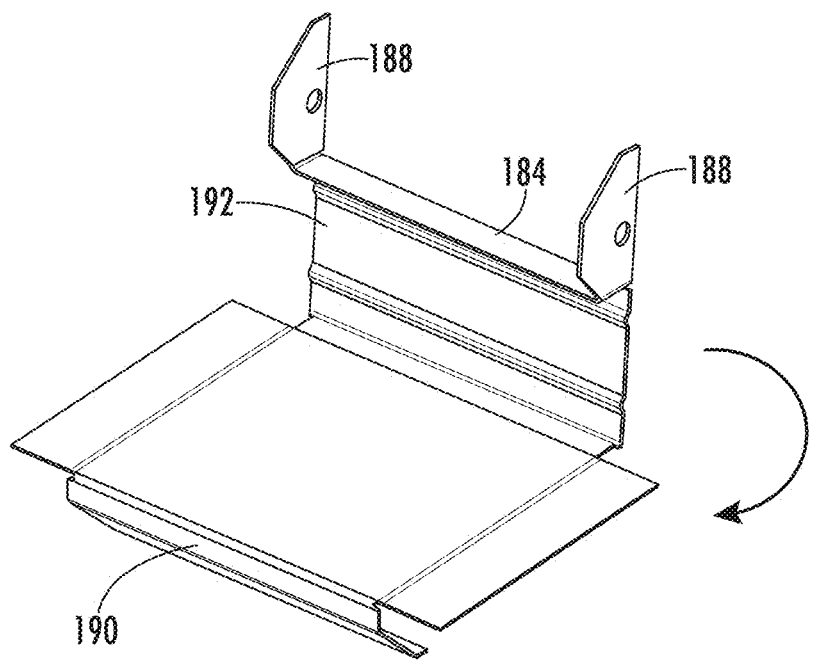

As shown in FIG. 15, side plates 188 are folded to be perpendicular to the remainder of end portion 184. A second end portion 190 is folded so as to be oriented in part perpendicular and in part oblique to the remainder of blank 182. Next, as shown in FIG. 16, portion 192, which carries end portion 184 and side plates 188, is folded under. This forms the bottom surface of the end platform.

Figure 17:
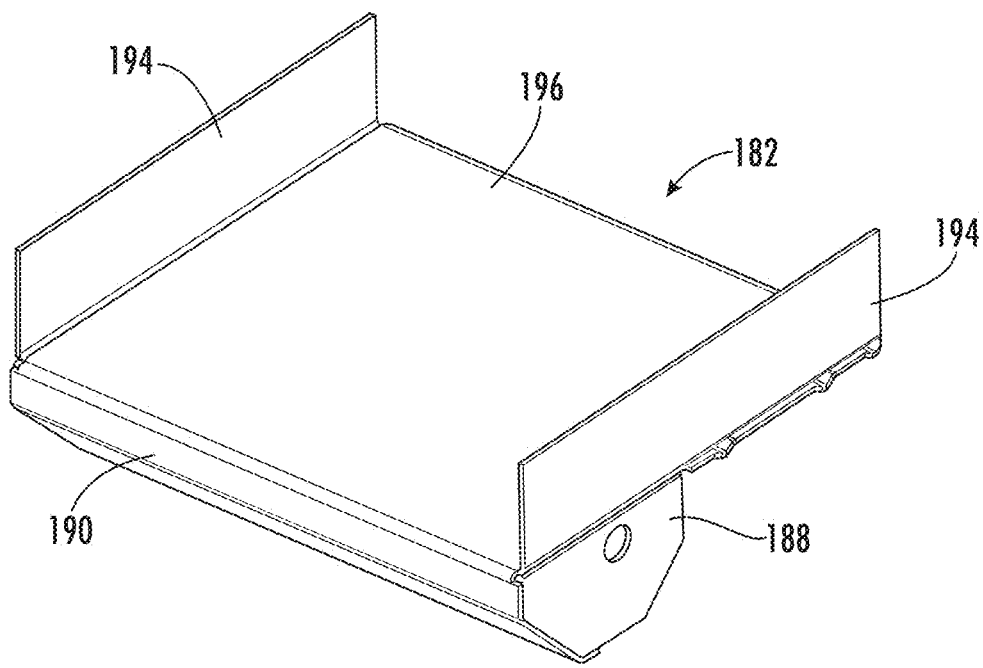
Figure 18:
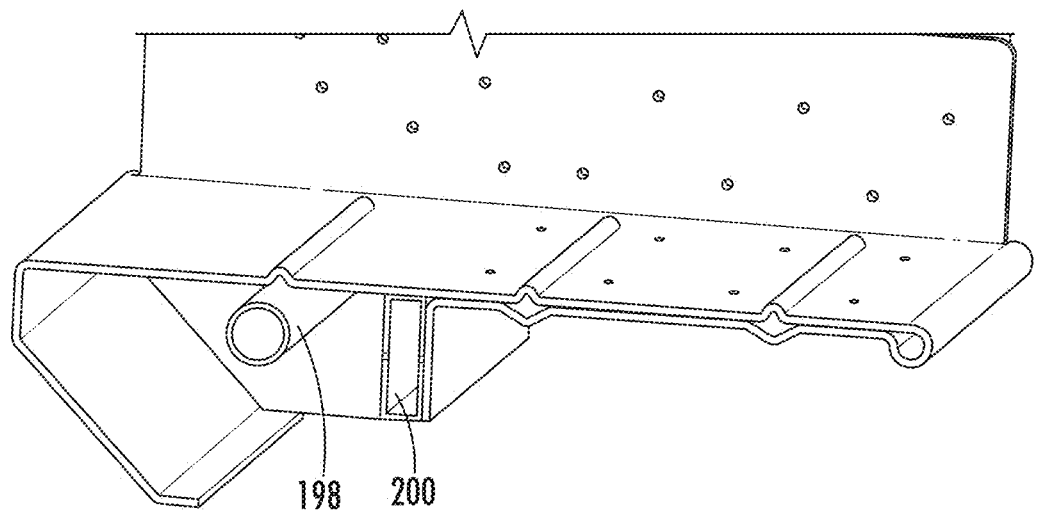
FIG. 18 is a cross-sectional view showing the portion of the end platform as formed in FIGS. 13-17 assembled with other components.

Referring now to FIG. 17, lateral flanges 194 are folded up to be perpendicular to the portion 196 of blank 182 that forms the walking surface. The junction locations where the material comes together can then be suitably secured, such as by welding. As shown on FIG. 18, a tube 198 may be added to contain the axle rod. Additional supports, such as cross beam 200, may also be provided. One skilled in the art will appreciate that tube 188 and beam 200 will be suitably secured to blank 182, such as by welding.

Figure 19:
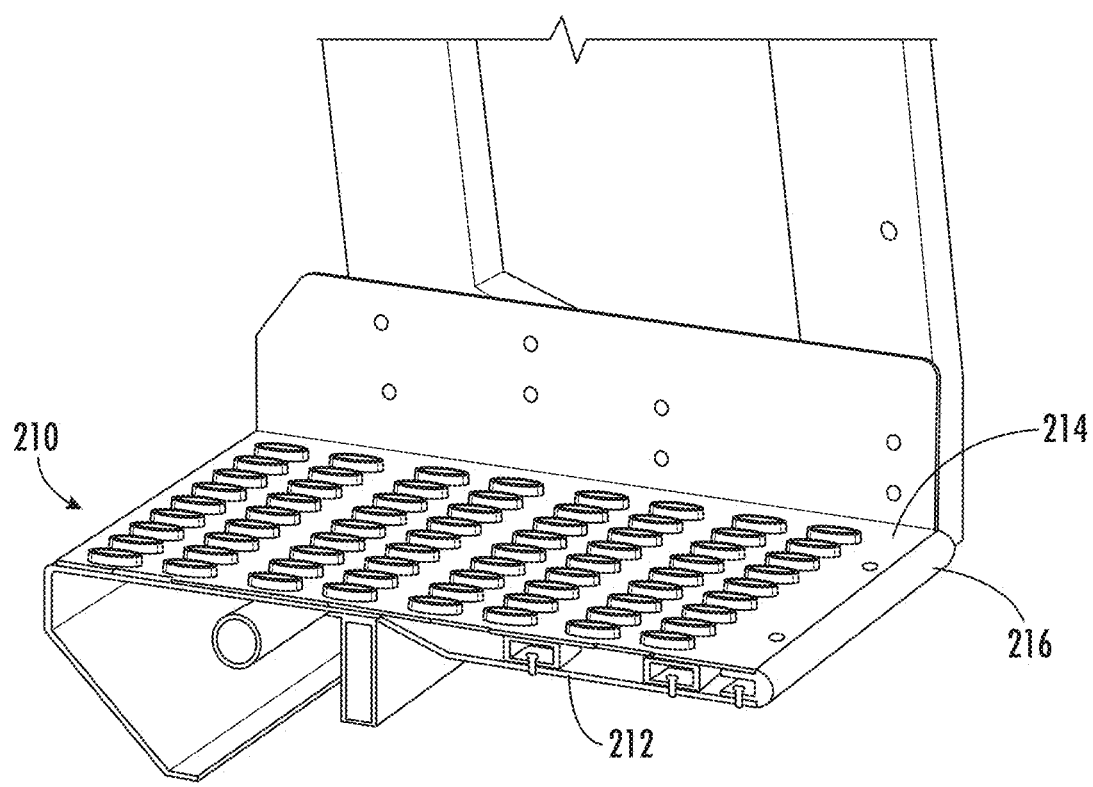
FIG. 19 is a cross sectional view showing the configuration of another embodiment of an end platform in accordance with the present invention.
Figure 20:
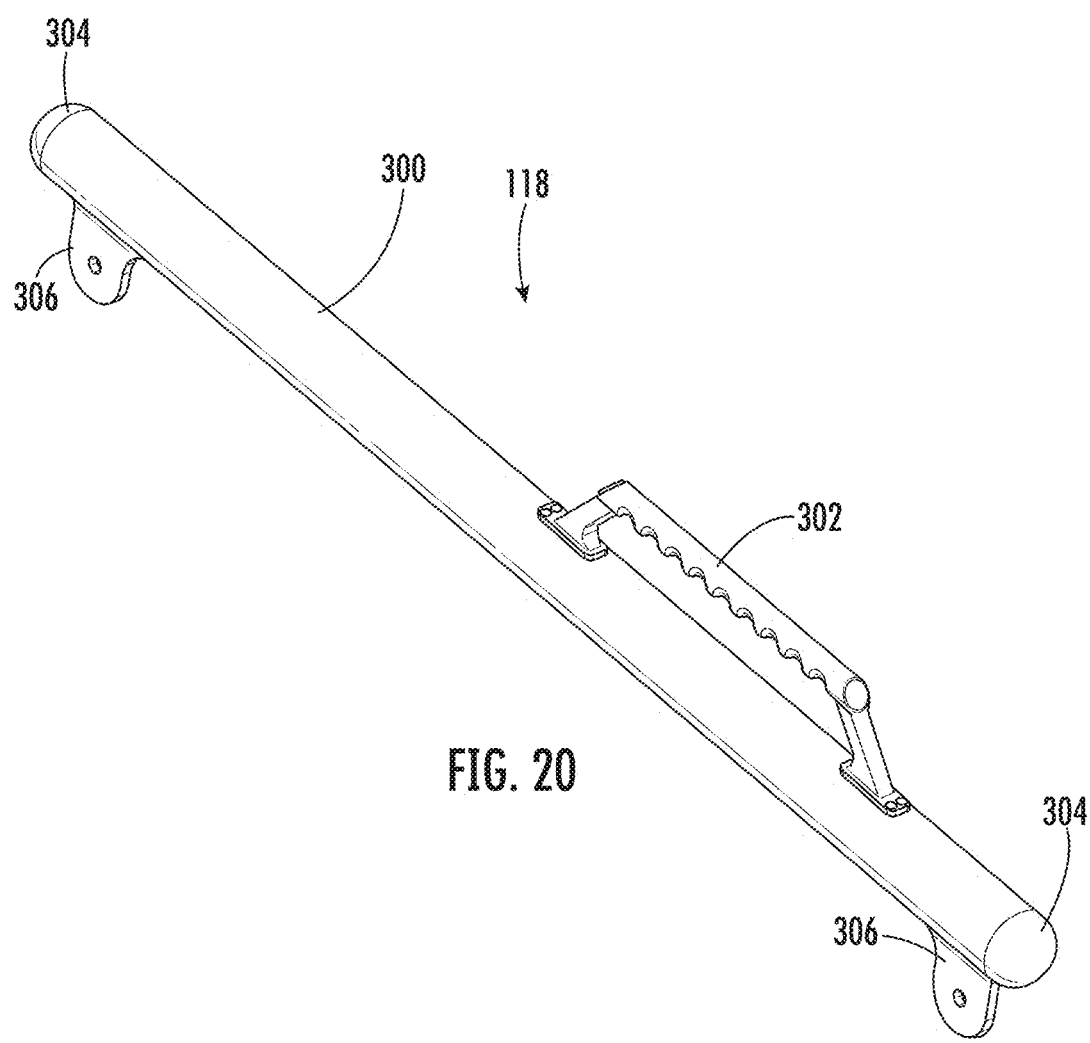
FIG. 20 is a perspective view of a handrail that may be used with a gangway assembly in accordance with an embodiment of the present invention.
Figure 21:
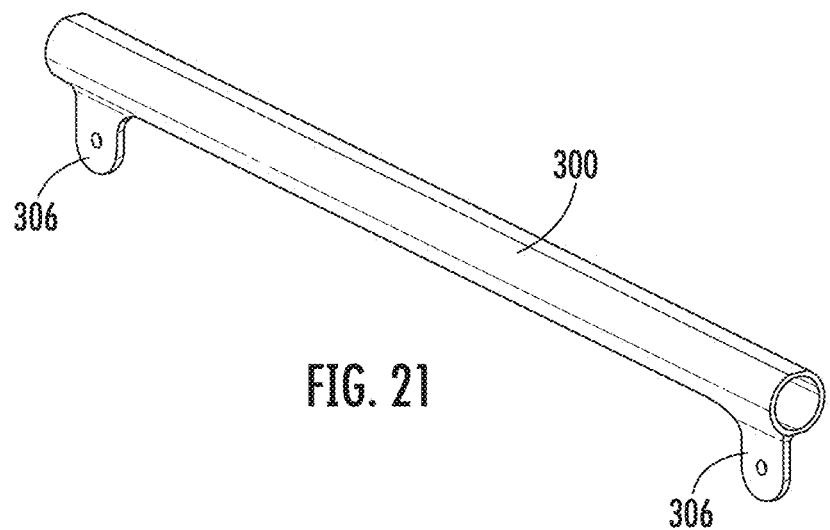
FIG. 21 is a perspective view of the main body of the handrail of FIG. 20.
Figure 22:
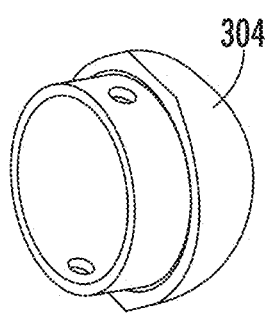
FIG. 22 is a perspective view of an end cap of the handrail of FIG. 20.
Figure 23:
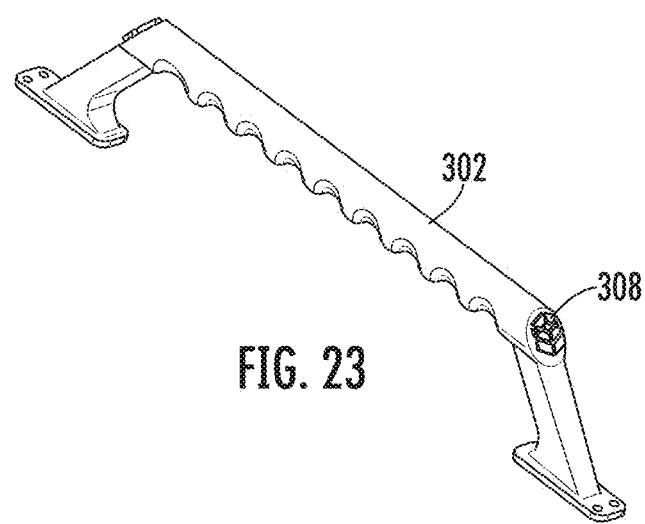
FIG. 23 is a perspective view of the grip body of the handrail of FIG. 20.

FIG. 19 illustrates a still further embodiment of an end platform 210 also having a minimal height between the bottom surface 212 that engages the container and the walking surface 214. In this embodiment, the distal end defines a channel in which a resilient bumper 216 is received.

Referring now to FIGS. 20-23, certain additional details about a preferred embodiment of a handrail 118 can be most easily explained. As shown, handrail 118 has a main tube portion 300 to which a hand grip 302 is attached (e.g., using screws or rivets). End caps 304 are situated at each end of main tube portion 300. In addition, integral tabs 306 depend from main tube portion 300 to facilitate attachment of handrail 118 to uprights of the gangway. Preferably, main tube portion 300 can be formed of an extrusion (e.g., an aluminum extrusion) having a cylindrical portion and a longitudinal fin. After the extrusion is cut to length, the fin can be machined to form the tabs 306. In other words, the tabs are formed unitarily with the main tube portion, rather than being separate pieces that are later attached. Notably, handgrip 302 may carry a logo 308 that identifies the manufacturer of the gangway.

Figure 24:
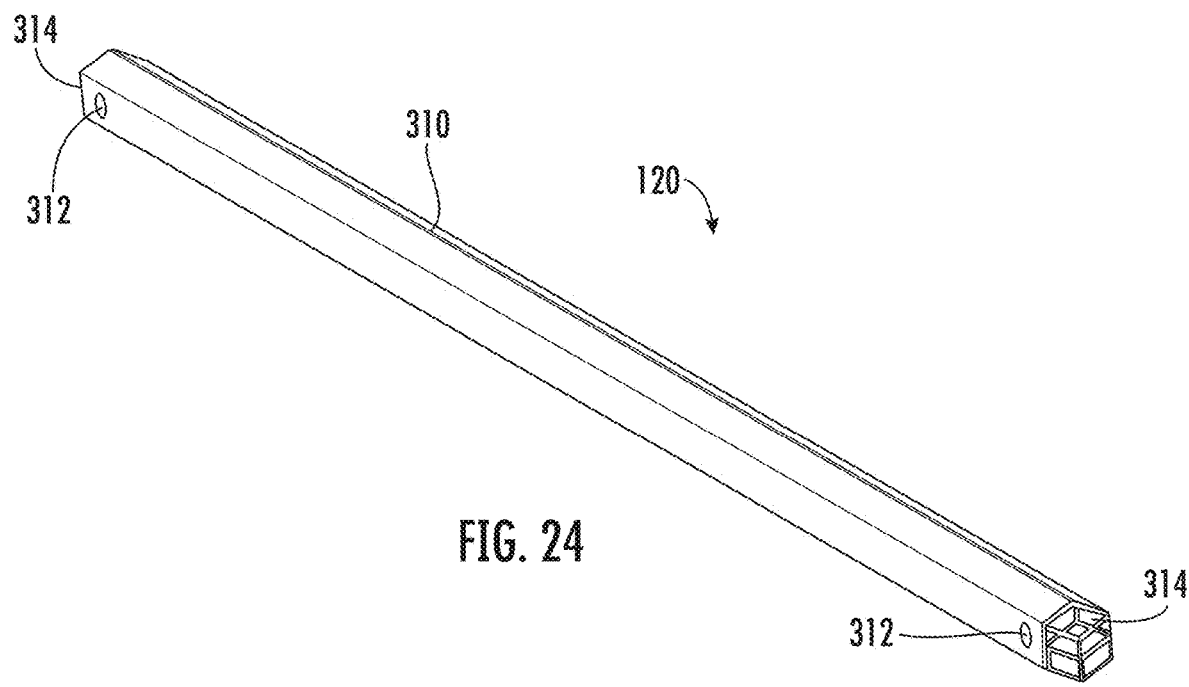
FIG. 24 is a perspective view of a midrail that may be used with a gangway assembly in accordance with an embodiment of the present invention.
Figure 25:
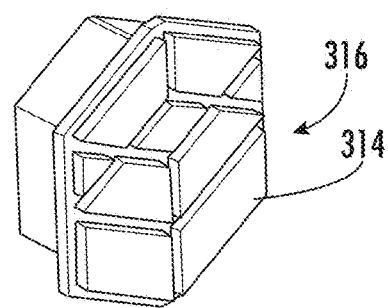
FIG. 25 is a perspective view of an end cap of the midrail of FIG. 24.

Certain additional details of midrail 120 can be most easily explained with reference to FIGS. 24-25. As can be seen, midrail 120 has a main tube portion 310 defining holes 312 for facilitating attachment to the gangway uprights. End caps 314 are situated at each end of main tube portion 310. Preferably, main tube portion 310 can be formed of an extrusion (e.g., an aluminum extrusion) that is cut to length. For example, in this embodiment, main tube portion 310 is formed as a hexagonal tube. End caps 314 may carry a logo 316 that identifies the manufacturer of the gangway.

Those skilled in the art should appreciate that the above description provides a novel gangway arrangement. While one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A gangway for use with a container to be accessed, said gangway comprising:
    a fixed platform;
    a support structure connected to the fixed platform in a manner that allows the support structure to rotate with respect to the fixed platform between a raised stowed position and a lowered deployed position; and
    an end platform pivotally connected at a distal end of the support structure, said end platform defining an upper walking surface and a bottom surface that engages a top of the container, a height between the bottom surface and the walking surface being no greater than one inch,
    wherein the end platform comprises a main platform structure formed of a bottom piece and a separate top piece assembled together, each of the bottom piece and the top piece being formed of a single piece of sheet metal,
    wherein the top piece defines a pair of opposed lateral flanges on respective lateral sides of the walking surface,
    wherein the top piece further comprises an end channel in which a front edge of the bottom piece is seated.

2. The gangway as set forth in claim 1, wherein the end platform further comprises first and second side structures attached to respective outside surfaces of said lateral flanges.

3. The gangway as set forth in claim 2, wherein each of said side structures comprises first and second uprights.

4. The gangway as set forth in claim 2, wherein the bottom piece includes a pair of opposed side plates defining aligned side plate holes for passage of an axle.

5. The gangway as set forth in claim 4, wherein the side structures define respective depending flanges defining flange holes aligned with said side plate holes.

6. The gangway as set forth in claim 5, wherein a portion of the support structure interposes each of the side plates and a respective one of the depending flanges of the respective side structures.

7. The gangway as set forth in claim 1, further comprising a self-raising assembly operative to rotate the support structure from the deployed position to the stowed position.

8. A gangway for use with a container to be accessed, said gangway comprising:
    a fixed platform;
    a support structure connected to the fixed platform in a manner that allows the support structure to rotate with respect to the fixed platform between a raised stowed position and a lowered deployed position; and
    an end platform pivotally connected at a distal end of the support structure, said end platform defining an upper walking surface and a bottom surface that engages a top of the container, the end platform having a main platform structure formed of a bottom piece and a separate top piece assembled together,
    wherein each of the bottom piece and the top piece are formed of a single piece of sheet metal, and the top piece defines a pair of opposed lateral flanges on respective lateral sides of the walking surface,
    wherein the top piece further comprises an end channel in which a front edge of the bottom piece is seated.

9. The gangway as set forth in claim 8, wherein the end platform further comprises first and second side structures attached to respective outside surfaces of said lateral flanges, said side structures each having first and second uprights.

10. The gangway as set forth in claim 8, wherein the bottom piece includes a pair of opposed side plates defining aligned side plate holes for passage of an axle.

11. The gangway as set forth in claim 8, further comprising a self-raising assembly operative to rotate the support structure from the deployed position to the stowed position.

12. A gangway for use with a container to be accessed, said gangway comprising:
    a fixed platform;
    a support structure connected to the fixed platform in a manner that allows the support structure to rotate with respect to the fixed platform between a raised stowed position and a lowered deployed position; and
    an end platform pivotally connected at a distal end of the support structure, said end platform defining an upper walking surface and a bottom surface that engages a top of the container,
    wherein the end platform comprises a main platform structure formed of a unitary piece of sheet metal configured to provide the walking surface, the bottom surface, opposed lateral flanges and opposed side pieces,
    wherein the walking surface is formed from a first portion of the unitary piece of sheet metal and the bottom surface is formed of a second portion of the unitary piece of sheet metal, the second portion of the unitary piece of sheet metal being adjacent to the first portion of the unitary piece of sheet metal such that a height between the bottom surface and the walking surface is no greater than one inch,
    wherein the second portion of the unitary piece of sheet metal defines a plurality of parallel cross ribs.

13. The gangway as set forth in claim 12, wherein the end platform further comprises first and second side structures attached to respective outside surfaces of said lateral flanges.

14. The gangway as set forth in claim 13, wherein each of said side structures comprises first and second uprights.

15. The gangway as set forth in claim 13, wherein the bottom piece includes a pair of opposed side plates defining aligned side plate holes for passage of an axle.

16. The gangway as set forth in claim 15, wherein the side structures define respective depending flanges defining flange holes aligned with said side plate holes.

17. The gangway as set forth in claim 16, wherein a portion of the support structure interposes each of the side plates and a respective one of the depending flanges of the respective side structures.

18. The gangway as set forth in claim 12, further comprising a self-raising assembly operative to rotate the support structure from the deployed position to the stowed position.

\* \* \* \* \*